Dec. 30, 1947.    L. E. MAYER    2,433,471
ROTARY VALVE
Filed Jan. 2, 1945    2 Sheets-Sheet 1
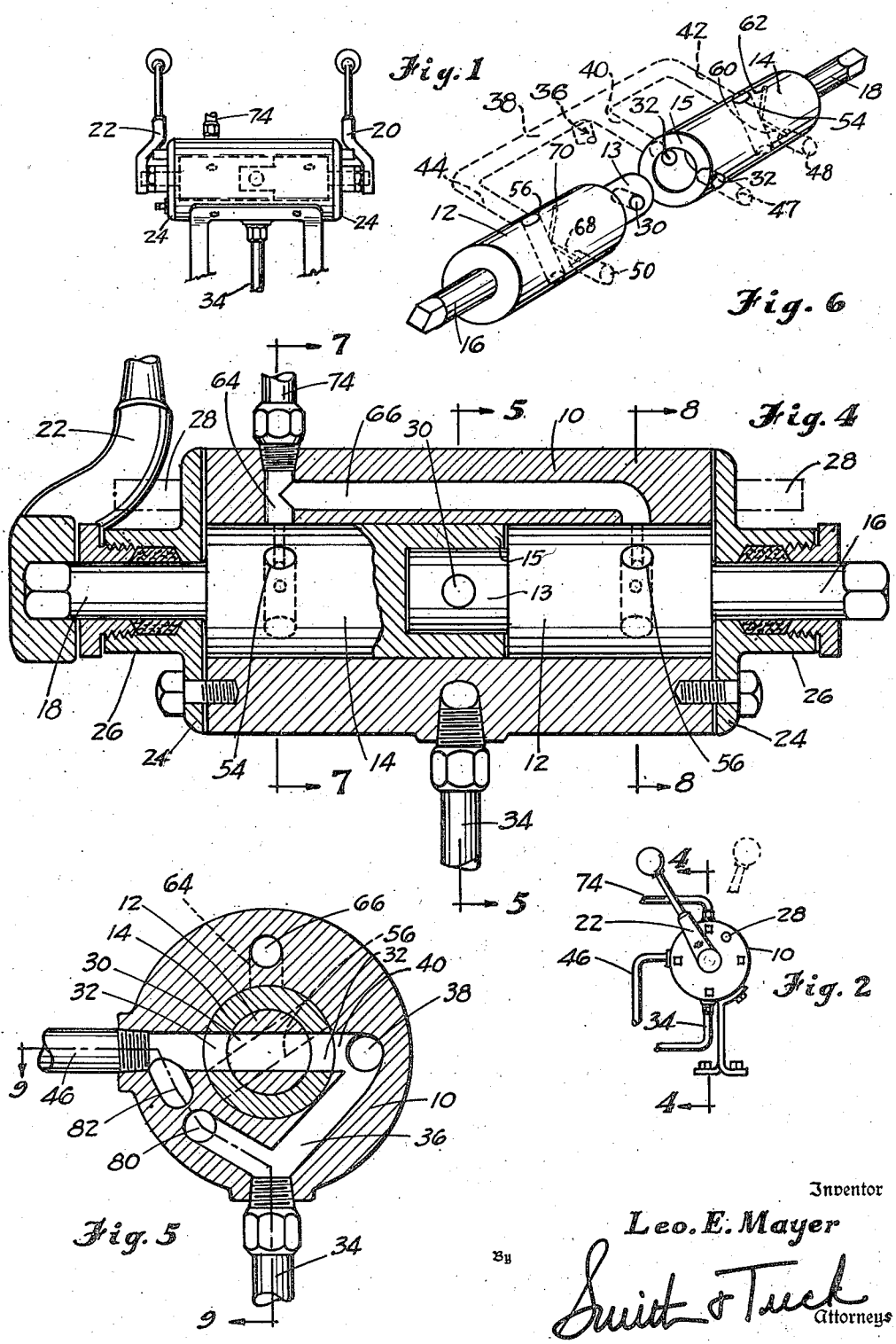
Inventor
Leo. E. Mayer

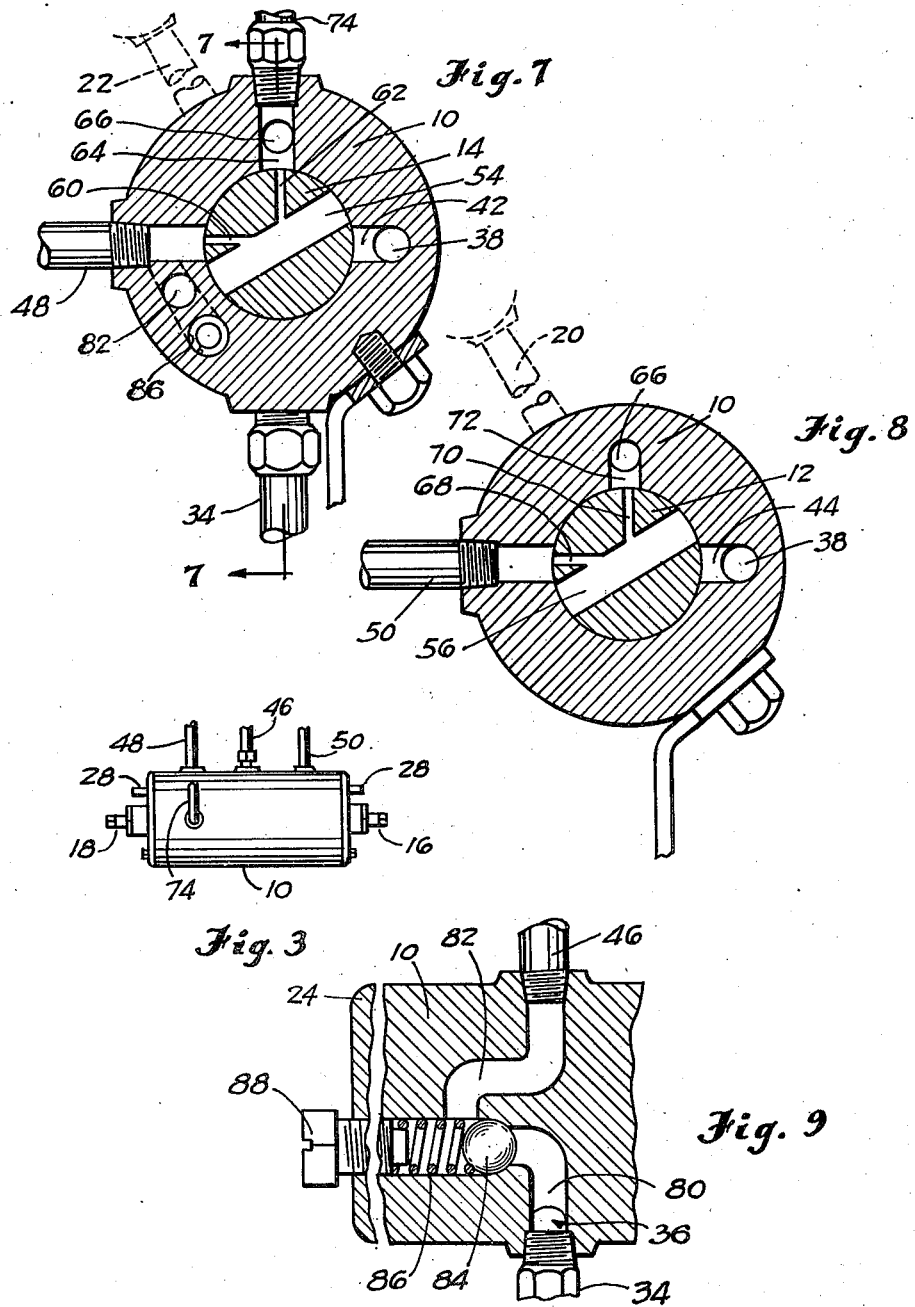

UNITED STATES PATENT OFFICE 2,433,471

ROTARY VALVE

Leo E. Mayer, Ephrata, Wash.

Application January 2, 1945, Serial No. 571,071

1 Claim. (Cl. 277—59)

This invention relates to a rotary valve and, more particularly, to a valve of the type in which oscillating cylindrical plugs are employed to control the flow of fluid to paired expansible chambers.

In some machines pairs of cylinders are employable for either jointly or separately and selectively operating the cylinders. Such an occasion arises in connection with a track-laying tractor wherein the treads on opposite sides of the vehicle are independently clutched for the purposes of applying power to either or both the endless tracks in manoeuvring the machine. The application of hydraulic power for the operation of such clutches has heretofore been impeded by the lack of suitable dual action valve means to facilitate the handling of oil under pressure to such cylinders. It is preferable that such a control mechanism closely simulate the action of the usual manually operated control levers whereby the clutches have been previously operated. It is an object of my invention to provide a rotary valve operable manually in a manner similar to the operation of the clutch levers of a conventional tractor.

Another object of my invention is the provision of a rotary valve for controlling the transmission of hydraulic fluid under pressure to paired expansible chambers either individually or collectively.

A still further object of the invention is the provision, in a valve as described, of a single casing containing the various oilways and operating parts to unify the fluid control to multiple cylinders.

Still another object of my invention is to provide, in a valve of the type described, two co-axially aligned oscillatable cylinders of the plug type which can be readily oscillated either individually or jointly to permit the rapid actuation of paired expansible chambers.

The foregoing objects and others ancillary thereto I prefer to accomplish as follows:

According to a preferred embodiment of my invention, I provide within a valve case a pair of longitudinally and axially aligned oscillatable cylindrical plugs having suitable oilways therethrough. An end of one of the plugs is cupped and the other has a reduced boss to fit in said cup. Alignable oilways are formed through the walls of the cup and the boss for selectively controlling the flow of fluid at a mid-position between the oscillatable plugs. In the casing, oil passages are formed and arranged to permit the introduction and distribution of pressurized hydraulic fluid to the oilways of the oscillatable members. A bleeder circuit is set into the main supply lines. A spring-loaded relief valve is included in this latter circuit to permit oil to escape from the main line to the reservoir when the amount of oil delivered by a constant displacement pump is too great for the purposes intended.

The novel features that I consider characteristic of my invention I set forth with particularity in the appended claim. The invention itself, however, both as to its organization and its method of operation, together with additional objects and advantages thereof, will best be understood from the following description of a specific embodiment when read in connection with the accompanying drawing, in which:

Figure 1 is a view in elevation of my rotary valve;

Figure 2 is an end elevational view of the valve;

Figure 3 is a top plan view of the valve;

Figure 4 is a longitudinal, sectional view taken on line 4—4 of Figure 2;

Figure 5 is a transverse sectional view taken on line 5—5 of Figure 4;

Figure 6 is an exploded view, in perspective, of the oscillatable plugs employed in my valve;

Figures 7 and 8 are transverse sectional views taken on lines 7—7 and 8—8 respectively of Figure 4; and Figure 9 is a fragmentary sectional view taken on line 9—9 of Figure 5.

Referring to the figures of the drawings, the numeral 10 designates a valve casing having a longitudinal opening therethrough in which I mount for oscillation the male cylindrical plug 12 and the female plug 14. Each of said plugs has a stem 16, 18 to which are attached the throttle levers 20 and 22 respectively. Cover plates 24 close the ends of the valve casing 10 and each includes a gland 26 for sealing the stems 16 or 18. On each of the plates 24 is a stop 28, against which the adjacent throttle lever, either 20 or 22, abuts to limit movement thereof or indicate registry of passages in the attached oscillatable plug at a desired location.

The male plug 12 has a boss 13 thereon and the female plug has a cup end 15 of a size to accommodate the boss 13. Diametrically lateral through the boss 13 is the oilway 30. In similar manner diametrically through the walls of the cup 15 are the openings 32. The openings 30 and 32 are alignable or may be disaligned to either pass or prevent the passage of hydraulic fluid flowing in a portion of the control circuit.

Oil under constant pressure is supplied through the main line 34 from a constant displacement pump (not shown) and is introduced into the casing 10 to flow in passage 36 which intersects with the distribution header 38 that is formed in the casing and lies substantially parallel alongside the position of the members 12 and 14. The header 38 has laterals 40, 42 and 44 which pierce the casing to the opening in which is placed the oscillatable member 12 and 14. From the casing at an opposite side to the position of the header 38 are the fluid lines 47, 48 and 50. Fluid line 46 leads from the control valve to a suitable reservoir (also not shown) from which fluid is drawn by the constant displacement pump and the circuit will be through 34, 36, 38, 40, 32, 30, 47, out into line 46 to the reservoir when the device is set at a neutral position.

Member 12 has a diametrically disposed oilway 56 and in member 14 there is a similar oilway 54, each of which is disposed in the bodies 12 and 14 at an angle to the passages 30 and 32 as the case may be. When the lever 20 is swung into abutment with the adjacent stop 28 the oilway 56 is aligned with the lateral 44 and oil may flow thence from the main line through the header 38 and into the cylinder line 50 to actuate a cylinder that may be coupled thereto. Under such circumstances, no flow of oil would then be permitted through the line 48.

In the event that it is desired to actuate both cylinders and to cause oil to flow in lines 48 and 50 simultaneously, the lever 22 as well as the lever 20 will be brought into engagement with the stops 28 and the flow of oil will be divided from the header 38 through the passages 54 and 56 and into the distribution lines 48 and 50.

At such time as there is oil under back pressure in the line 48, as when the piston is being returned by spring means or its equivalent, the back flow of fluid from line 48 is obtained through the undersize by-pass passages 60 and 62, the former of which, when oilway 54 is misaligned with both the lateral 42 and line 48, is aligned with fluid flowing from line 48 and the bleeder passage 62 aligns with the riser 64 and the bleeder header 66. Passage 56 is similarly supplied with bleeder passages 68 and 70 the former of which communicates from line 50 through to the header 66 by means of the riser 72.

The bleeder line 74 is in communication with the header 66 so that oil flowing out through the header is returned to the reservoir with which line 74 is coupled.

A relief by-passage 80 as more fully shown in Figure 9 intersects the fluid incoming through main line 34, which under certain circumstances communicates with passage 82 that intersects with the line 46. Between passages 80 and 82 is the spring-loaded ball valve 84, placed under tension by means of the compression spring 86 that is compressed by the screw 88. It is by this combination of elements that a predetermined pressure is obtained upon the ball 84 so that, should the pressure of the fluid in line 34 become greater than is required, the ball 84 will unseat and a relief of the fluid back to the reservoir will be obtained. Normally 93 pounds pressure will operate the pistons, in which case the relief valve 84 is set to open under approximately 95 pounds pressure.

Assuming that my rotary valve is included in a fluid conduit system comprising a reservoir from which fluid is drawn and pressurized by constant displacement pump, the valve will be placed at a location adjacent the operator where he may manually move the levers 20 and 22. In such an instance the line 48 would preferably be coupled with a cylinder that operates the clutch to the left hand endless track of the vehicle and the line 50 would be coupled to a cylinder that operates the clutch of the right hand track. If the operator desired that the equipment, proceeding forward, turn he would pull back either lever 20 or 22 depending on the direction of turn desired thereby effecting a fluid pressure from the pump to the associated cylinder. The cylinder chamber is then expanded by the displacement of a piston due to the incoming fluid under pressure and a track of the vehicle would be uncoupled from the motive power source. In the event that the operator desires to turn to the right he would manipulate the right lever 20 but would not operate the left lever 22 whereupon only the left track would be powered and the vehicle would turn right pivoting on the dead track. Conversely a left turn would be obtained by oscillating only lever 22 to close the circuit through line 30 to the left cylinder while the right cylinder is not actuated at all.

At such time as the two oscillatable members are positioned so that the passages 30 and 32 are in alignment and the fluid circuit from the pump is merely through the valve and back to the reservoir, such fluid as may be in the cylinder and is under the pressure of a spring-loaded piston therein, will bleed backward into the reservoir through the bleeder passages 60, 62 and the header 66 and through outlet line 74. Through such an arrangement, an abrupt relief of the action of the cylinder upon the clutch is avoided.

While I have shown and described particular embodiments of my invention, it will occur to those skilled in the art that various changes and modifications may be made without departing from the invention, and I, therefore, aim in the appended claim to cover all such changes and modifications as fall within the true spirit and scope of my invention.

Having thus described my invention, I claim:

An hydraulic valve, comprising: a casing having an inlet port; a longitudinal distribution conduit in a wall of said casing in communication with said inlet port; a first duct in said casing positioned diametrically opposite said distribution conduit and having an outlet; a second and a third duct longitudinally aligned with said first duct in said casing, said first duct being positioned between said second and third ducts; two axially aligned relatively rotatable valves in said casing having lateral passages to be selectively disposed between said distribution conduit and said second and third ducts and having means external of the casing for rotating the same; said valves having an axial pin and socket connection therebetween, said connection having transversely arranged registering ports aligned between said distribution conduit and said first duct and unconnected with the lateral passages of said valves, said valve passages each being arranged to be out of circuit between said distribution conduit and said second and third ducts when said ports are aligned.

LEO E. MAYER.

REFERENCES CITED

The following references are of record in the file of this patent:

UNITED STATES PATENTS

| Number | Name | Date |
|---|---|---|
| 1,759,647 | Kincannon | May 20, 1930 |
| 2,298,267 | Alderman | Oct. 13, 1942 |
| 2,328,606 | Boldt | Sept. 7, 1943 |